United States Patent [19]

Lange et al.

[11] Patent Number: 4,727,116

[45] Date of Patent: Feb. 23, 1988

[54] WATER-SOLUBLE POLYMERS AND USE AS BUILDING MATERIAL AUXILIARIES

[75] Inventors: Werner Lange, Visselhövede; Frank Höhl, Neuenkirchen; Klaus Szablikowski, Walsrode, all of Fed. Rep. of Germany

[73] Assignee: Wolff Walsrode AG, Walsrode, Fed. Rep. of Germany

[21] Appl. No.: 893,126

[22] Filed: Aug. 4, 1986

[30] Foreign Application Priority Data

Aug. 14, 1985 [DE] Fed. Rep. of Germany ....... 3529095

[51] Int. Cl.⁴ .................... C08F 220/56; C08F 8/34; C04B 24/24

[52] U.S. Cl. .................... 525/326.9; 524/3; 525/328.2; 526/264; 526/287

[58] Field of Search .............. 526/264, 259, 287; 525/326.9, 328.2, 353

[56] References Cited

U.S. PATENT DOCUMENTS 4,521,579  6/1985  Engelhardt ................. 526/287
4,563,290  1/1986  Okada ..................... 252/8.55 D

*Primary Examiner*—Christopher Henderson
*Attorney, Agent, or Firm*—Sprung Horn Kramer & Woods

[57] ABSTRACT

The present invention relates to new water-soluble copolymers based on acrylic acid derivatives and their use as building material auxiliaries.

5 Claims, No Drawings

WATER-SOLUBLE POLYMERS AND USE AS BUILDING MATERIAL AUXILIARIES

The present invention relates to new water-soluble copolymers based on acrylic acid derivatives and their use as building material auxiliaries.

Wearing floors, for example wooden parquet, tiles or floor coverings made of plastic, can be laid only on horizontal and absolutely level floor surfaces. When buildings are erected, however, only uneven concrete surfaces are obtained in the carcass, so that for this reason a screed usually first has to be applied to these uneven concrete floors.

Whilst screeds of bituminous mastic concrete, cement or magnesite were previously used to produce the horizontal and level surfaces required and involved a considerable expenditure of labour for their application, levelling and smoothing, mortar mixtures which, after addition of water, have a flowable and pumpable consistency and can be levelled and smoothed onto the uneven floor itself under the influence of gravity, like a liquid, have also been known for some time.

Thus, a mortar composition which consists of anhydride, if appropriate sand, an activator, a resin which is modified with sulphide or sulphonic acid and is based on an amino-s-triazine with at least 2 $NH_2$ groups, as an additive which increases strength, a wetting agent and, if appropriate, an antifoaming agent, is known from DE-OS (German Published Specification) No. 1,943,634. Melamine/formaldehyde condensation products, which are added as a concrete plasticizer, are used here. A concrete mixture which can be pumped as easily as possible, has extremely good flow properties and hardens as rapidly as possible is to be obtained by plasticizing the concrete.

The disadvantage of these products based on melamine/formaldehyde is that their plasticizing properties persist only for approximately 15 minutes.

Furthermore, the requirements of a flow control agent in a self-levelling flow screed are in principle different from those of a concrete plasticizer. Thus, completely homogeneous flow of the screed composition is required with a flow control agent for a self-levelling flow screed. In particular, no sedimentation of the heavier constituents should occur during flow. The flow control auxiliary for concrete screed must thus have a certain carrying capacity for the building material mixture. Since it is entirely possible for delays to occur on the building site during application of the flow screed, it is necessary for the flow screed auxiliary also still to retain its full effectiveness 1 hour after addition to the building material mixture.

However, sedimentation of the heavier constituents during flow occurs with auxiliaries based on melamine/formaldehyde condensation products. Furthermore, after 1 hour, it is not possible for the flow screed mixture to be brought back, by stirring, into a satisfactorily flowable state, so that homogeneous flow is achieved. Attempts have also been made to improve the carrying capacity by additives. However, this has not been completely satisfactory.

Surprisingly, it is now possible, with the polymers according to the invention, to provide flow control auxiliaries for building material mixtures which are added in only small amounts and effect the desired homogeneous flow of building material mixtures to give screeds with an absolutely level surface. It is not necessary here to add any auxiliaries and additives to achieve homogeneous flow. A particular advantage of these polymers according to the invention is that their full effectiveness is also still retained 1 hour after addition to the building material mixture.

The invention thus relates to water-soluble copolymers which consist to the extent of (1) 5 to 50 mol %, preferably 10 to 40 mol %, of radicals of the formula I

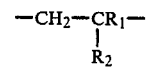

(2) 0 to 20 mol %, preferably 0 to 15 mol %, of radicals of the formula II

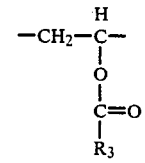

(3) 5 to 50 mol %, preferably 20 to 50 mol %, of radicals of the formula III

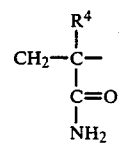

(4) 5 to 50 mol %, preferably 10 to 40 mol %, of radicals of the formula IVa or IVb

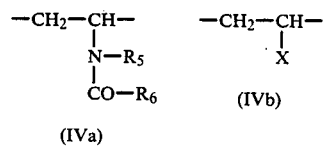

(5) 2 to 50 mol %, preferably 5 to 30 mol %, of radicals of the formula V

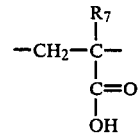

and (6) 5 to 50 mol %, preferably 5 to 30 mol %, of radicals of the formula VI

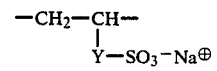

and in which the sum of (1) to (6) must always give 100 mol %, and to their use as building material auxiliaries, in particular as flow control auxiliaries, in self-levelling screed mixtures and floor-levelling compositions.

In the radicals I to VI of the randomly built up polymers:

$R_1$ denotes hydrogen or a methyl group, $R_2$ denotes an alkoxycarbonyl group with 1 to 4 C atoms in the alkoxy group, preferably an ethyloxy-, isobutyloxy- or tert.-butyloxycarbonyl group, an alkanoyloxy group with 1 to 4 C atoms or a β-hydroxyalkoxycarbonyl group with 2 or 3 C atoms, $R_3$ denotes a methyl or an ethyl group, $R_4$ denotes hydrogen or a methyl group, $R_5$ and $R_6$ are identical or different and denote hydrogen or a methyl or ethyl group, or together form a trimethylene or pentamethylene ring, $R_7$ denotes hydrogen or a methyl group, and Y denotes a covalent bond or a group of the formula

 

and

X denotes an imidazole or carbazole radical.

The polymers according to the invention can also preferably be reacted with lower aliphatic aldehydes, preferably formaldehyde, and sodium bisulphite, 0.1 to 1 mol, preferably 0.4 to 0.8 mol/per mol of the radicals of the formula III of aldehyde being added. The sodium bisulphite is preferably employed in an equimolar proportion relative to the aldehyde.

Copolymers which are derived from ethyl acrylate, vinyl acetate, acrylamide, 1-vinyl-2-pyrrolidone, acrylic acid and 2-acrylamido-2-methylpropanesulphonic acid, and reaction products of these copolymers with formaldehyde and sodium bisulphite, are particularly preferred.

The excellent activity of the copolymers according to the invention as flow control auxiliaries in building material mixtures was completely surprising, since copolymers built up similarly from, for example, acrylamide, AMPS and vinylpyrrolidone are completely unsuitable.

The polymers according to the invention can be prepared in a manner which is known per se, for example by free radical polymerization in aqueous solution.

The polymerization is thereby carried out in the customary manner under an inert gas atmosphere, preferably under nitrogen. The polymerization temperature should be between 20° and 100° C., preferably between 30° and 60° C.

The polymerization can be started by the customary polymerization initiators, for example $K_2S_2O_8$, $H_2O_2$, $(NH_4)_2S_2O_8$ or an $H_2O_2$/isoascorbic acid mixture. As a rule 1 to 10 g of polymerization initiator are employed per 100 g of monomers.

For carrying out the polymerization, the monomers are preferably dissolved in water in a concentration in the range from 20 to 40% by weight of the total monomers. A surfactant can be added for better distribution of the water-insoluble monomers. Since the aim is to obtain polymers with chains which are as short as possible, relatively large amounts of a chain length regulator are employed. Hydroquinone, isopropanol or other suitable chain length regulators can be used for this purpose. After rinsing with nitrogen, the reaction is started. The copolymers can also advantageously be reacted with formaldehyde and sodium bisulphite, in order to increase the content of sulphonic acid groups in the finished product.

The copolymer according to the invention can be isolated from the aqueous solution by distilling off the water or by precipitation by mixing the solution with a water-miscible organic solvent, such as methanol, ethanol, acetone or the like. Preferably, however, the aqueous solution of the reaction product is used directly, if appropriate after adjustment of a desired concentration, as a flow control auxiliary for screed mixtures.

The copolymers according to the invention are outstandingly suitable as auxiliaries for building material mixtures. They effect homogeneous, uniform flow of screed mixtures to give a completely level, smooth surface. It is particularly advantageous that these copolymers according to the invention also still fully retain their effectiveness after 1 hour after addition of the polymer to the building material mixture. An outstanding flow control agent for use in screed mixtures and floor levelling compositions is thus available.

The invention therefore also relates to building material mixtures, in particular screed mixtures, based on cement, sand and fly ash, which are characterized in that they contain the copolymers according to the invention as flow control agents.

For formulation of flow screed mixtures of the flow control auxiliary, such as, for example, the known auxiliary based on melamine/formaldehyde condensation products, are usually employed in amounts of 0.4 to 0.8% by weight, based on the solid employed. With the copolymers according to the invention, however, it is possible for outstanding flow of screed mixtures already to be achieved when only 50% of the hitherto customary amounts are employed. The flow control auxiliary according to the invention thus already displays its full effectiveness in amounts of 0.05 to 1% by weight, preferably 0.15 to 0.4% by weight, based on the solids. The screed mixtures are preferably based on cement, sand and fly ash.

EXAMPLE 1

329 g of deionized water are taken in a 1 l polymerization flask with a stirrer, reflux condenser and gas inlet tube for an inert gas. 22.58 g of ethyl acrylate are then added. This amount corresponds to 0.2256 mol of ethyl acrylate.

9.06 g of vinylacetate ≙ 0.1053 mol, 128.3 g of 30% strength aqueous acrylamide solution ≙ 0.5414 mol, 40.07 g of 1-vinyl-2-pyrrolidone ≙ 0.3610 mol, 8.67 g of acrylic acid = 0.1203 mol and 62.26 g of a 50% strength solution of sodium 2-acrylamido-2-methylpropanesulphonate (AMPS) are then added.

These amounts of monomers used correspond to a composition of 15 mol % of ethyl acrylate, 7 mol % of vinyl acetate, 36 mol % of arylamide, 24 mol % of 1-vinyl-2-pyrrolidone, 8 mol % of acrylic acid and 10 mol % of AMPS.

Hyddroquinone in an amount of 6 g of a 1% strength solution ≙ 0.04%, based on the total amount of monomers weighed out, is employed as a chain length regulator. In order to achieve better distribution of the water-insoluble monomers, a solution of the anionic surfactant sodium alkyl-diglycol ether-sulphate, based on naturally occurring fatty alcohols R—O—($CH_2$—$CH_2$—O)-2—$SO_2Na$ alkyl≙75-70% $C_{12}$, 25-30% $C_{14}$ (Genopol LRO ®, liquid) is added in an amount of 3.16 g of a 1% strength solution=0.1%, on the sum of vinyl acetate and the amount of ethyl acrylate weighed out.

After the end of the addition, the mixture is stirred at a speed of 350 to 400 rpm and is flushed with about 10 l/hour of nitrogen, in order to displace the oxygen from the solution. This flushing with nitrogen is maintained throughout the entire reaction time. The residual oxygen content at the start of the polymerization is advantageously between 1.2 and 1.8 ppm. The pH value of the reaction mixture is about 2.1. The reaction mixture is warmed to 35° C.

After flushing with about 10 l/hour of nitrogen for about 20 minutes, the polymerization reaction is started by addition of 0.75 g of $K_2S_2O_8 \hat{=} 0.5\%$ (all the amounts of initiator are based on the amount of monomer weighed out). After 1 hour, a further 0.75 g of $K_2S_2O_8 \hat{=} 0.5\%$, based on the amount of monomer weighed out, is added. After 2 hours, 1.5 g of $K_2S_2O_8 \hat{=} 1\%$ are added. 4 hours after the start of the reaction, the reaction mixture becomes slightly viscous and a further 1.5 g of $K_2S_2O_8 = 1\%$ are added. After 6 hours, the reaction has ended and 11.19 g of 50% strength sodium hydroxide solution are added in order to raise the pH value from 1.9 to 6.2.

The end product obtained is characterized by the following data:

| | |
|---|---|
| pH value: | 6.4 |
| Concentration: | 24% by weight |
| Viscosity (VT$_{24}$ Haake): | 100 mPa.s at 25° C. |
| Limiting viscosity ($\eta$): | 0,32 g · dl$^{-1}$ |

(measured on a 1% strength NaCl solution at 25° C.)

Polymers 2 to 33, the composition of which can be seen from Table 1, can be prepared analogously to Example 1.

EXAMPLE 34

324.3 g of deionized water are taken in a 1 l polymerization flask with a stirrer, reflux condenser and gas inlet tube for an inert gas. 34.9 g of ethyl acrylate are then added. This amount corresponds to 0.3405 mol of ethyl acrylate.

142.15 g of a 30% strength aqueous acrylamide solution=0,600 mol, 37.8 g of 1-vinyl-2-pyrrolidone$\hat{=}$0,3405 mol, 18.69 g of acrylic acid$\hat{=}$0,2594 mol and 33.57 g of a 50% strength solution of sodium 2-acrylamido-2-methylpropanesulphonate (AMPS)$\hat{=}$0,0811 mol are then added.

These amounts of monomers employed correspond to a composition of 21 mol % of ethyl acrylate, 37 mol % of acrylamide, 21 mol % of 1-vinyl-2-pyrrolidone, 16 mol % of acrylic acid and 5 mol % of AMPS.

Hydroquinone in an amount of 6 g of a 1strength solution$\hat{=}$0.04%, based on the total amount of monomer weighed, is added as the chain length regulator. In order to achieve a better distribution of the water-insoluble monomers, a solution of the surfactant Genapol is added in an amount of 3.41 g of a 1% strength solution=0.1%, on the amount of ethyl acrylate weighed out.

After the end of the additions, the mixture is stirred at a speed of 350 to 400 rpm and is flushed with about 10 l/hour of nitrogen in order to displace the oxygen from the solution. This flushing with nitrogen is maintained throughout the entire reaction time. The residual oxygen content at the start of the polymerization is advantageously between 1.2 and 1.8 ppm. The pH value of the reaction mixture is about 2.8. The reaction mixture is warmed to 35° C.

After flushing with about 10 l/hour of nitrogen for 20 minutes, the polymerization reaction is started by addition of 0.75 g of $K_2S_2O_8 \hat{=} 0.5\%$ (all the amounts of initiator are based on the amount of monomer weighed out). After 1 hour, a further 0.75 g of $K_2S_2O_8 \hat{=} 0.5\%$, based on the amount of monomer weighed out, is added. 4 hours after the start of the reaction, the reaction mixture becomes slightly viscous and a further 1.5 g of $K_2S_2O_8 \hat{=} 1\%$ are added. The reaction has ended after 6 hours.

The intermediate product obtained is characterized by the following data:

| | |
|---|---|
| pH value: | 2.6 |
| Concentration: | 24% by weight |
| Viscosity (VT$_{24}$ Haake): | 200 mPa.s at 25° C. |

After the polymerization, the reaction of the polymer with formaldehyde and sodium bisulphite is carried out.

For this, the polymer solution is brought to a pH value of 8.9 at 20° C. with 15.31 g of 50% strength sodium hydroxide solution and 12.17 g of 25% strength sodium hydroxide solution.

Thereafter, 20.66 ml of 40% strength formaldehyde solution are added and the mixture is heated up to 50° C., with continuous stirring. The temperature of 50° C. is maintained for 2 hours.

31.22 g of NaHSO$_3$ are now added, and the mixture is heated up to a temperature of 60° C.

The reaction has ended after 1 hour at 60° C.

The solution obtained can be used directly. Polymers 35 to 40 the composition of which can be seen from Table 1, can be prepared analogously to Example 34.

The following abbreviations are used in Table 1:
AMPS: sodium 2-acrylamido-2-methylpropanesulphonate
NVPY: 1-vinyl-2-pyrrolidone
AAM: acrylamide
EA: ethyl acrylate
IBA: isobutyl acrylate
TBA: tert.-butyl acrylate
HEA: hydroxyethyl acrylate
HPA: hydroxypropyl acrylate
VAC: vinyl acetate
VMACAM: N-vinyl-N-methylacetamide
NVSA: sodium vinylsulphonate
NASS: sodium styrenesulphonate
AA: acrylic acid
MAA: methacrylic acid
MA: methacrylate
HPMA: hydroxypropyl methacrylate
HEMA: hydroxyethyl methacrylate
VCLT: vinylcaprolactam

TABLE 1

| Example No. | mol % | Mon. 1 | mol % | Mon. 2 | mol % | Mon. 3 | mol % | Mon. 4 | mol % | Mon. 5 | mol % | Mon. 6 | Viscosity |
|---|---|---|---|---|---|---|---|---|---|---|---|---|---|
| 1 | 15 | EA | 7 | VAC | 36 | AAM | 24 | NVPY | 8 | AA | 10 | AMPS | 100 |
| 2 | 40 | EA | | | 32 | AAM | 10 | NVPY | 8 | AA | 10 | AMPS | 300 |
| 3 | 15 | EA | 7 | VAC | 30 | AAM | 30 | NVPY | 8 | AA | 10 | AMPS | 100 |
| 4 | 15 | EA | 7 | VAC | 30 | AAM | 20 | NVPY | 8 | AA | 20 | AMPS | 200 |

TABLE 1-continued

| Example No. | mol % | Mon. 1 | mol % | Mon. 2 | mol % | Mon. 3 | mol % | Mon. 4 | mol % | Mon. 5 | mol % | Mon. 6 | Viscosity |
|---|---|---|---|---|---|---|---|---|---|---|---|---|---|
| 5 | 15 | EA | 7 | VAC | 28 | AAM | 20 | NVPY | 20 | AA | 10 | AMPS | 300 |
| 6 | 15 | EA | 7 | VAC | 24 | AAM | 16 | NVPY | 8 | AA | 30 | AMPS | 200 |
| 7 | 15 | EA | 7 | VAC | 16 | AAM | 24 | NVPY | 8 | AA | 30 | AMPS | 100 |
| 8 | 40 | EA | | | 20 | AAM | 10 | NVPY | 8 | AA | 22 | AMPS | 300 |
| 9 | 15 | EA | 7 | VAC | 43 | AAM | 10 | VMACAM | 8 | AA | 17 | AMPS | 1,400 |
| 10 | 15 | EA | 7 | VAC | 36 | AAM | 24 | VMACAM | 8 | AA | 10 | AMPS | 300 |
| 11 | 15 | HPA | 7 | VAC | 36 | AAM | 24 | NVPY | 8 | AA | 10 | AMPS | 200 |
| 12 | 15 | EA | 7 | VAC | 36 | AAM | 24 | NVPY | 8 | MAA | 10 | AMPS | 200 |
| 13 | 30 | EA | | | 32 | AAM | 20 | NVPY | 8 | AA | 10 | AMPS | 300 |
| 14 | 10 | EA | 5 | VAC | 47 | AAM | 20 | NVPY | 8 | AA | 10 | AMPS | 200 |
| 15 | 15 | EA | 7 | VAC | 50 | AAM | 10 | NVPY | 8 | AA | 10 | AMPS | 400 |
| 16 | 15 | EA | 7 | VAC | 18 | AAM | 12 | NVPY | 8 | AA | 40 | AMPS | 200 |
| 17 | 15 | EA | 7 | VAC | 50 | AAM | 10 | NVPY | 8 | AA | 10 | AMPS | 400 |
| 18 | | | 22 | EA | 36 | AAM | 21 | NVPY | 4 | AA | 17 | AMPS | 200 |
| 20 | 15 | MA | 7 | VAC | 36 | AAM | 24 | NVPY | 8 | AA | 10 | AMPS | 100 |
| 21 | 15 | HEMA | 7 | VAC | 36 | AAM | 24 | NVPY | 8 | AA | 10 | AMPS | 300 |
| 22 | 15 | HPMA | 7 | VAC | 36 | AAM | 24 | NVPY | 8 | AA | 10 | AMPS | 200 |
| 23 | 15 | HEA | 7 | VAC | 36 | AAM | 24 | NVPY | 8 | AA | 10 | AMPS | 200 |
| 24 | 15 | EA | 7 | VAC | 36 | AAM | 24 | NVPY | 8 | AA | 10 | AMPS | 900 |
| 25 | 11 | EA | 11 | VPP | 36 | AAM | 24 | NVPY | 8 | AA | 10 | AMPS | 200 |
| 26 | 15 | EA | 7 | VPP | 36 | AAM | 24 | NVPY | 8 | AA | 10 | AMPS | 200 |
| 27 | 7 | HEA | | | 44 | AAM | 17 | NVPY | 11 | AA | 17 | AMPS | 500 |
| 28 | 20 | VPP | 7 | VAC | 27 | AAM | 17 | NVPY | 19 | AA | 10 | AMPS | 200 |
| 29 | 8 | HEA | 23 | TBA | 26 | AAM | 15 | NVPY | 19 | AA | 9 | AMPS | 400 |
| 30 | | | 10 | TBA | 36 | AAM | 21 | NVPY | 23 | AA | 10 | NAVS | 200 |
| 31 | | | 17 | EA | 36 | AAM | 21 | NVPY | 21 | AA | 5 | AMPS | 700 |
| 32 | 11 | EA | 11 | VAC | 36 | AAM | 21 | NVPY | 11 | AA | 10 | AMPS | 200 |
| 33 | | | 15 | IBA | 36 | AAM | 21 | NVPY | 18 | AA | 10 | NAVS | 4,000 |
| 34 | 21 | EA | | VAC | 37 | AAM | 21 | NVPY | 16 | AS | 5 | AMPS | 200 |
| 35 | 21 | EA | | | 27 | AAM | 21 | NVPY | 11 | AA | 20 | AMPS | 100 |
| 36 | 15 | EA | 7 | VAC | 24 | AAM | 16 | NVPY | 8 | AA | 30 | AMPS | 200 |
| 37 | 15 | EA | 7 | VAC | 28 | AAM | 20 | NVPY | 20 | AA | 10 | AMPS | 300 |
| 38 | 40 | EA | | | 32 | AAM | 10 | NVPY | 8 | AA | 10 | AMPS | 300 |
| 39 | 15 | EA | 7 | VAC | 30 | AAM | 300 | NVPY | 8 | AA | 10 | AMPS | 100 |
| 40 | 30 | EA | | | 32 | AAM | 20 | NVPY | 8 | AA | 10 | AMPS | 300 |

In the following use examples, the polymers according to the invention are compared with known flow control agents for building material mixtures. For this use, it is particularly important that the flow control agent leads to the flow screed composition being spread as widely as possible in the space in question.

The so-called degree of spreading under standardized conditions is used in technological tests to measure this flow control effect. It is also particularly important that the flow screed mixture also still retains its full effectiveness after 1 hour. For this reason, the degree of spreading is determined again after 1 hours. The degree of spreading after 1 hour should, in the ideal case, be exactly the same as the degree of spreading immediately after preparation of the flow screed mixture. In order to guarantee steady building progress, it must be possible to walk on the flow screed after 16 hours (that is to say on the morning of the following working day). For this reason, the hardening after 16 hours is checked in the laboratory test for use of the flow screed.

The flow screed test is carried out as follows:
The following recipe is used:

| | | |
|---|---|---|
| | 175 g | of cement PZ 35 |
| | 175 g | of fly ash |
| | 725 g | of sand with a particle size of 0 to 2 mm |
| total | 1,075 g | of solid |

The amounts of flow control agents (polymers) and antifoaming agents added are based on this amount of solids of 1,075 g.

The following additives are used in all the use examples:

0.2% of flow control agent (100% pure), based on the basic recipe amount, and
0.1% of antifoaming agent SB 2030 S, based on the basic recipe amount The amount of water depends on the flow properties of the screed. An initial total water amount of 105 ml is taken as a basis, and water is metered in as required. This initial total water amount contains the water introduced by the polymer with its solution.

Test procedure

The sand, the cement and the fly ash are mixed in the dry state in a laboratory mixer for 2 minutes. The polymer solution, the antifoaming agent and the water are weighed out into a glass beaker and stirred and the mixture is then poured into the homogeneous dry mixture of sand, cement and fly ash, the dry mixture being stirred.

After 2 minutes, the mixing process is interrupted and the sample is evaluated according to whether the surface flows completely smoothly within 15 to 30 seconds. If this property is not yet achieved, water is added in steps of 5 ml and this amount of water is then stirred in for 1 minute. The stirring operation is then interrupted again and the sample is again evaluated as to whether the surface flows completely smoothly within 15 to 30 seconds. Shortly before this completely smooth flow is achieved, the water is added in steps of only 1 ml.

The amount of water required to achieve a completely smooth flow should be as low as possible, in order to avoid cracking in the screed.

After completely smooth flow has been achieved, the degree of spreading is determined. Up to this point in time, the screed must have been stirred for a total of 10 minutes. The degree of spreading is then determined.

Determination of the degree of spreading

A cylinder made of plastic and with a diameter of 7 cm and a height of 8.5 cm standing in the middle of a dish of plastic with a diameter of 32 cm, is filled to the brim with the flow screed. Thereafter, the cylinder made of plastic is raised so that the flow screed can flow apart. After 3 minutes, the average diameter of the pancake of flow screed which has spread out is determined by several measurements. This measurement indicates the degree of spreading. During flow of the screed, its surface is also simultaneously evaluated, and should be as smooth as possible. The flow of the screed should also as far as possible lead to a circular shape.

After the degree of spreading has been determined, a polystyrene beaker is filled with the entire screed composition and the composition is left to stand for 1 hour. After this time, calculated from the addition of the polymer solution to the dry mixture, the surface of the screed is tested for any formation of a skin. The screed is then stirred thoroughly, and is evaluated as to whether the screed has already set to a substantial degree. It should be possible to render the screed readily flowable again by stirring.

The degree of spreading is then determined again, as described above, and the surface is evaluated.

Finally, a polystyrene beaker is filled with a sample of 100 g of screed and this sample is left to harden for 16 hours.

Testing of the hardening

Hardening of the sample is tested by pressing firmly on the surface with a finger. If the surface of the screed gives, it cannot be walked on. This is a coarse preliminary test.

The hardening is additionally investigated with a needle apparatus according to Vickert. In this, it is investigated whether a metal needle with a diameter of about 1 mm and loaded with a weight of 300 g penetrates into the sample. 10 measurements are carried out and the mean value of the penetration depth is determined from these measurements. The screed is regarded as hardened if the needle could not penetrate the screed on any of the 10 measurements.

The following samples were used for the investigations:

A. Copolymer (according to the invention), consisting of 15 mol % of ethyl acrylate, 7 mol % of vinyl acetate, 36 mol % of acrylamide, 24 mol % of 1-vinyl-2-pyrrolidone, 8 mol % of acrylic acid and 10 mol % of AMPS (Example 1, Table 1).

B. Modified copolymer (according to the invention), prepared with a composition of 21 mol % of ethyl acrylate, 37 mol % of acrylamide, 21 mol % of 1-vinyl-2-pyrrolidone, 16 mol % of acrylic acid and 5 mol % of AMPS. This polymer was also reacted with formaldehyde and sodium bisulphite after the polymerization (Example 34, Table 1).

C. Commercially available melamine/formaldehyde condensation product intended for use as a concrete plasticizer (comparison product).

The results of the investigations with these products and with the flow control agents according to Example No. 2, 3, 5, 9, 11, 15, 16 and 22 are summarized in Table 2:

TABLE 2

| Flow control agent | Water consumption in ml | Degree of spreading immediately after preparation of the screed in ml | Degree of spreading 1 hour after addition of the flow control agent in ml | Remarks on flow after 1 hour | Hardening determined according to Vickert |
| --- | --- | --- | --- | --- | --- |
| A | 129 | 250 | 265 | easy to liquefy by stirring; flows smoothly without sedimentation | hardened |
| B | 123 | 245 | 230 | easy to liquefy by stirring; flows smoothly without sedimentation | hardened |
| C | 140 | 165 | 165 | does not flow, uneven surface, marked curvature of the screed pancake | hardened |
| Example 2 | 128 | 250 | 230 | easy to liquefy by stirring; flows smoothly without sedimentation | hardened |
| Example 3 | 128 | 240 | 225 | easy to liquefy by stirring; flows smoothly without sedimentation | hardened |
| Example 5 | 125 | 265 | 225 | easy to liquefy by stirring; flows smoothly without sedimentation | hardened |
| Example 9 | 131 | 245 | 210 | easy to liquefy by stirring; flows smoothly without sedimentation | hardened |
| Example 11 | 126 | 250 | 240 | easy to liquefy by stirring; flows smoothly without sedimentation | hardened |
| Example 15 | 124 | 260 | 255 | easy to liquefy by stirring; flows smoothly without sedimentation | hardened |
| Example 16 | 112 | 255 | 230 | easy to liquefy by stirring; flows smoothly without sedimentation | hardened |
| Example 22 | 129 | 190 | 210 | easy to liquefy by stirring; flows smoothly without sedimentation | hardened |

The results of the technological investigations clearly show the superior effectiveness of the flow control agents according to the invention compared with comparison product C.

Very much higher degrees of spreading immediately after preparation of the screed are achieved with the products according to the invention than with comparison product C. The products according to the invention advantageously flow completely smoothly, without sedimentation, whilst comparison product C leads only to an uneven flow of the screed pancake, even with the higher amount of water, and the pancake also still has a curvature.

The superiority of the products according to the invention becomes particularly clear in the determination of the degree of spreading 1 hour after addition of the flow control agent.

Here, both products according to the invention still have the insignificantly changed high initial degree of spreading and effect a completely smooth flow of the screed, without sedimentation.

Comparison product C, in contrast, is not flowable and leads to a screed pancake with an uneven surface and marked curvature.

The products according to the invention thus achieve a far higher effectiveness than the products known hitherto and thus represent a substantial improvement of the prior art.

What is claimed is:

1. A water-soluble copolymer having a $VT_{24}$Haake viscosity at 25° C. of 100 to 4000 mPa.s rendering it suitable for use as a flow controlling auxiliary for building material, consisting (1) 5 to 50 mol % of radicals of the general formula

   (I)

(2) 0 to 20 mol % of radicals of the general formula

   (II)

(3) 5 to 50 mol % of radicals of the general formula

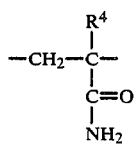
   (III)

(4) 5 to 50 mol % of radicals of the general formula

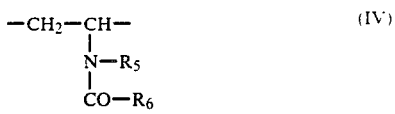
   (IV)

(5) 2 to 50 mol % of radicals of the general formula

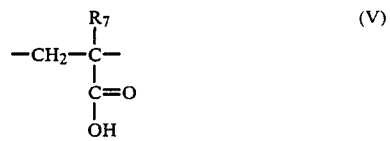
   (V)

(6) 5 to 50 mol % of radicals of the general formula

   (VI)

wherein, in the radicals of the formulae (I) to (IV),
   $R_1$ denotes hydrogen or a methyl group,
   $R_2$ denotes an alkoxycarbonyl group with 1 to 4 carbon atoms in the alkoxy group, an alkanoyloxy group with 1 to 4 carbon atoms or a β-hydroxyalkoxycarbonyl group with 2 or 3 carbon atoms,
   $R_3$ denotes methyl or an ethyl group,
   $R_4$ denotes a hydrogen or a methyl group,
   $R_5$ and $R_6$ are identical or different and denote hydrogen, a methyl or ethyl group or together form a trimethylene or pentamethylene ring,
   $R_7$ denotes hydrogen or a methyl group, and
   Y denotes a covalent bond or a group of the formula $-CO-NH-C(CH_3)_2-CH_2-$ or

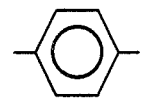

and wherein the sum of (1) to (6) must always by 100 mol %.

2. A water-soluble copolymer according to claim 1,
   (1) 10 to 40 mol % of radicals of the formula (I),
   (2) 0 to 15 mol % of radicals of the formula (II),
   (3) 20 to 50 mol % of radicals of the formula (III),
   (4) 10 to 40 mol % of radicals of the formula (IV),
   (5) 5 to 30 mol % of radicals of the formula (V) and
   (6) 5 to 30 mol % of radicals of the formula (VI).

3. A water-soluble copolymer according to claim 1, derived from ethyl acrylate, vinyl acetate, acrylamide, 1-vinyl-2-pyrrolidone, acrylic acid and 2-acrylamido-2-methylpropanesulphonic acid.

4. A water-soluble copolymer according to claim 1, wherein the monomers providing the recited radicals have been copolymerized in the presence of a chain length regulator, thereby obtaining a copolymer with short chains.

5. A reaction product of formaldehyde and sodium bisulphite with a water-soluble copolymer according to claim 1 and derived from ethyl acrylate, vinyl acetate, acrylamide, 1-vinyl-2-pyrrolidone, acrylic acid and 2-acrylamido-2-methylpropanesulphonic acid.

* * * * *